3,758,458
LOW D.P. HIGH D.P. VISCOSE MIXTURE USING HIGH CELLULOSE CONCENTRATION
John Dyer, Glen Mills, Pa., assignor to
FMC Corporation, Philadelphia, Pa.
No Drawing. Filed Dec. 8, 1971, Ser. No. 206,204
Int. Cl. C08b 9/00; D01f 3/10
U.S. Cl. 260—212                    10 Claims

ABSTRACT OF THE DISCLOSURE

A mixture of viscose solutions suitable for preparing shaped regenerated cellulose articles wherein one viscose contains a medium to low cellulose content and the cellulose has a high molecular weight and the other viscose contains a large amount of cellulose which has a medium to low molecular weight, is disclosed herein.

It is economically desirable to produce regenerated cellulose articles in the viscose process using a viscose spinning solution with a high cellulose content. It is possible to produce a useful viscose spinning solution with very high cellulose content (12–17%) if, during its preparation, the alkali cellulose is aged to a very low degree of polymerization (D.P.) prior to xanthation. With optimization of viscose composition and spinning conditions, filaments having conditioned tenacities up to about 3 grams per denier can be produced with relatively high cellulose content-low D.P. viscose. However, the more desirable higher tenacity filaments require a viscose containing a high D.P. cellulose and this type of viscose must be limited in cellulose content in order to obtain a solution with a Ball Fall viscosity in a suitable range for spinning or extrusion.

It is an object of this invention to provide a viscose composition of a relatively high cellulose content containing more large cellulose molecules than in a viscose prepared by the usual method which is useful for the production of strong regenerated cellulose articles.

It is a further object of this invention to provide a viscose composition for the more economic production of strong regenerated cellulose fibers.

It is a still further object of this invention to provide a method for the more economic production of strong regenerated cellulose articles from viscose.

These and other objects are accomplished in accordance with this invention which is a viscose composition suitable for the preparation of shaped regenerated cellulose articles comprising a mixture of one part by weight of a viscose containing up to about 7 weight percent cellulose having a D.P. of at least about 700 and from about 0.5 to about 5 parts by weight of a viscose containing at least about 9 weight percent cellulose having a D.P. of no greater than about 550.

The method of this invention comprises homogeneously mixing the above described viscoses, forming the mixture into a shaped article, and coagulating and regenerating the article.

While the viscose of this invention is applicable to the economic manufacture of various shaped articles including, for example, self-supporting sheets, fabric coatings, artificial chamois and sponges and the like, it is of primary importance in the preparation of regenerated cellulose filaments and the following disclosure will pertain primarily to filament preparation in order to demonstrate the invention.

The lower cellulose content viscose described above will range in cellulose content from up to about 7% by weight down to about 3% and lower, preferably from about 4 to 6% for commercial practice. This viscose is produced from an alkali cellulose having a D.P. of at least about 700 up to 1200 and higher preferably about 800 to 1000. After the conventional steps of forming the alkali cellulose crumb, it is preferably not aged in order to retain its basic high D.P. The xanthation and addition of caustic is carried out in a conventional manner to obtain a viscose having up to about 7 weight percent cellulose, from about 3 to about 8 weight percent sodium hydroxide, and from about 20 to about 40% carbon disulfide, preferably about 28–32%, based on the weight of the cellulose. The viscose can be held for up to about 24 hours at 25° C. before spinning during which time little reduction of the cellulose D.P. takes place. Its Ball Fall viscosity will generally range from about 60 to about 450 seconds.

The high cellulose content viscose of this invention will range in cellulose content from at least about 9% by weight up to 17% by weight and higher, preferably from about 10 to about 15% for commercial practice. This viscose may be produced by first deliberately degrading or over-aging the alkali cellulose crumb to a D.P. of 550 and less depending on the cellulose content such that the resulting viscose will have a Ball Fall viscosity ranging from about 60 to about 450 seconds. The xanthation and addition of caustic is carried out in a conventional manner to obtain a viscose having at least 9 weight percent cellulose, from about 6 to about 10 weight percent sodium hydroxide, and from about 20 to about 40% carbon disulfide, preferably 28 to 32%, based on the weight of the cellulose. As in the case of the high D.P. cellulose viscose, this viscose can be held for up to 24 hours at 25° C. before spinning during which time little reduction of the cellulose D.P. occurs. This viscose alone will produce fibers having very poor physical properties but the mixing of this viscose with a viscose containing large cellulose molecules will provide a viscose capable of producing fibers of improved properties.

As stated above, to obtain the low D.P. cellulose viscose, the alkali cellulose crumb is generally degraded in some manner. The most common means of degradation is aging but in this case ordinary aging practices would involve rather long periods of time to degrade the alkali cellulose sufficiently. There are a number of practical ways of reducing the alkali cellulose crumb aging step. These include aging at elevated temperature, aging in the presence of a catalyst, oxidative degradation, mechanical degradation or a combination of two or more of the above. It is also possible to eliminate the alkali cellulose crumb aging step by including hydrogen peroxide in the steep. In this way, the basic D.P. of the cellulose can be significantly reduced in a short time especially if elevated temperatures are used. Alternatively, cellulose pulp with the required initial high and/or low D.P. may be obtained directly from a pulp manufacturer.

The viscoses of this invention can and often will contain spinning additives or viscose modifiers which are disclosed at length in the prior art and need no further delineation here. The viscose additives or modifiers are incorporated in the individual viscoses prior to mixing or in the mixed viscose solutions prior to spinning.

The viscoses may be combined or mixed in a convenient manner. For example, the two viscose solutions can be continuously introduced at the desired ratio in the holding tanks prior to pumping the mixture to the spinning machine.

The method of this invention is carried out by mixing the two different viscose solutions together forming a shaped article, and coagulating and regenerating the article. The shaped articles are usually formed by extrusion of the viscose through a multihole spinneret, a slot or other shaped orifice. The coagulation and regeneration is carried out in any suitable manner including exposing the shaped article to a heated atmosphere or acidic medium. The most commercially useful coagulation and regenerating procedure is to immerse the shaped viscose article in an aqueous acidic bath which coagulates and at least partially regenerates the article. Such baths are usually formulated to produce articles of the desired qualities whereby, for example, in the case of filaments, they may be further processed to produce articles of the desired physical properties. A preferred aqueous spinning bath composition for filaments produced in accordance with this invention comprises from about 5 to 15 weight percent of sulfuric acid, from about 6 to 20 weight percent of sodium sulfate and from about 1 to 12 weight percent of zinc sulfate. This bath is preferably maintained at a temperature of from about 45 to about 60° C. The initial bath can be followed by another aqueous bath to continue or complete regeneration which may or may not contain a small amount of sulfuric acid and sulfates. This secondary bath can also be heated if desired. Advantageously, a secondary bath is used as a stretching medium whereby the filaments are stretched from about 60% to 160%, preferably 80 to 120% of their original length. If desired, spinning bath additives can be employed as is well known in the art.

Filaments produced in accordance with the method of this invention can be taken up as continuous filament yarn or cut into staple fiber.

EXAMPLE I

Two viscose solutions were prepared from the same cellulose pulp which had a basic D.P. of about 1050. The first viscose was prepared from unaged alkali cellulose crumb and consisted of 5.8 weight percent cellulose, 6 weight percent sodium hydroxide and 40% of carbon disulfide, based on the weight of the cellulose. The D.P. of the cellulose in the viscose was about 850 and the Ball Fall viscosity of the viscose was 228 seconds.

The second viscose was prepared from alkali cellulose crumb aged for 7 days at 25° C. The viscose consisted of 12.3 weight percent cellulose, 6 weight percent sodium hydroxide and 40% carbon disulfide based on the weight of the cellulose. The D.P. of the cellulose in the viscose was about 390 and the Ball Fall viscosity was 221 seconds.

The two viscose solutions were mixed together at various weight ratios in a can using a paddle blade stirrer for one hour mixing time. The viscose compositions were spun into fibers by extruding them through a 217 hole spinneret into a constant spinning bath composition of 5.6–5.9 weight percent sulfuric acid, 14 weight percent sodium sulfate and 6 weight percent zinc sulfate maintained at 57° C. The fibers were wet stretched, dried and collected. The physical properties of yarns prepared in this manner having a denier per filament of 1.5 are set forth in the following table.

In addition to the above results obtained from fibers spun at a constant spinning bath composition, fiber properties of fibers prepared from the same viscose mixtures were obtained at spin bath acidity giving maximum tenacity. These results are listed in the following table.

TABLE II

| Viscose mixture, parts by volume | | Percent cell in viscose | 60% stretch | | | | 80% stretch | | | | 100% stretch | | | | 80% stretch | | | |
|---|---|---|---|---|---|---|---|---|---|---|---|---|---|---|---|---|---|---|
| A | B | | $T_c$ | $E_c$ | M | B.E. | $T_c$ | $E_c$ | M | B.E. | $T_c$ | $E_c$ | M | B.E. | $T_w$ | $E_w$ | SM | B.E. |
| 1 | 0 | 5.8 | 4.04 | 18.1 | 100.1 | .46 | 4.71 | 11.9 | 118.4 | .34 | 5.67 | 9.5 | 139.6 | .30 | 3.37 | 28.4 | 3.72 | .42 |
| 1 | 1 | 9.2 | 3.62 | 18.9 | 92.1 | .45 | 4.15 | 14.7 | 109.8 | .39 | 4.72 | 10.5 | 127.2 | .30 | 2.71 | 31.1 | 4.75 | .41 |
| 1 | 2 | 10.0 | 3.23 | 16.8 | 99.6 | .37 | 3.79 | 12.8 | 112.0 | .32 | 4.29 | 10.5 | 128.5 | .28 | 2.29 | 31.6 | 5.09 | .37 |
| 1 | 4 | 10.9 | 3.28 | 15.2 | 101.7 | .34 | 3.86 | 10.6 | 117.7 | .26 | 4.22 | 9.2 | 128.6 | .24 | 2.29 | 24.6 | 4.52 | .29 |
| 1 | 9 | 11.6 | 3.38 | 16.8 | 95.4 | .38 | 3.78 | 11.1 | 117.0 | .28 | 4.06 | 8.0 | 140.5 | .20 | 2.24 | 27.2 | 4.75 | .32 |
| 0 | 1 | 12.3 | 3.02 | 15.2 | 93.7 | .32 | 3.56 | 10.9 | 110.3 | .25 | 3.77 | 10.0 | 119.1 | .24 | 2.22 | 26.6 | 5.29 | .32 |

From the above example and data, it is seen that the strength of the fibers increased as the high D.P. viscose fraction increased in the mixture. Since these fibers were prepared from viscoses having similar Ball Fall viscosities, the observed effect on tenacity could be due to either changes in the molecular weight distribution or cellulose concentration. From previous experiments, it had been determined that properties for fibers with constant molecular weight distribution made from viscoses at different cellulose concentrations were similar over a wide range of Ball Fall viscosities. Also, at constant Ball Fall viscosity for various cellulose concentrations obtained by aging the alkali cellulose, the fiber strength decreased as the basic D.P. of the cellulose decreased. This indicates that the effect of cellulose concentration at constant Ball Fall viscosity on fiber properties is due mostly to changes in the molecular weight distribution of the cellulose in the viscose composition.

The above experiments were carried out to determine the fraction of high D.P. cellulose viscose that must be mixed with a low D.P. cellulose viscose to maintain acceptable fiber properties at high cellulose concentration. From the above data and various other considerations, it has been found that significantly improved fiber properties will be obtained if (a) a relatively large fraction of high D.P. material is included in the mixed viscose or (b) the low cellulose concentration viscose contains very high D.P. celluose, i.e., the amount of low cellulose concentration viscose required will decrease as the D.P. of its cellulose molecule increases.

EXAMPLE II

Two viscoses were individually prepared. The first viscose was prepared from the same high D.P. pulps as used in Example I and the alkali cellulose crumb was not aged. It consisted of 6 weight percent cellulose, 6 weight percent sodium hydroxide and 40% carbon disulfide based on the weight of the cellulose. The Ball Fall viscosity of the viscose was 247 seconds.

The second viscose was prepared from a different pulp having an initial or basic D.P. of 620. The alkali cellulose was not aged and the viscose consisted of 10 weight percent cellulose, 6 weight percent sodium hydroxide and 40% carbon disulfide based on the weight of the cellulose. The D.P. of the cellulose in the viscose was about 550 and the Ball Fall viscosity of the viscose was 425 seconds.

TABLE I

| Viscose mixture, parts by weight | | Percent cell. in viscose | Percent $H_2SO_4$ in spin bath | Ball fall, sec. | 60% stretch | | | | 80% stretch | | | | 100% stretch | | | | 80% stretch | | | |
|---|---|---|---|---|---|---|---|---|---|---|---|---|---|---|---|---|---|---|---|---|
| A* | B* | | | | $T_c$* | $E_c$* | M* | B.E.* | $T_c$ | $E_c$ | M | B.E. | $T_c$ | $E_c$ | M | B.E. | $T_w$ | $E_w$ | SM* | B.E. |
| 1 | 0 | 5.8 | 5.6 | 228 | 3.82 | 14.9 | 104.4 | .36 | 4.71 | 11.9 | 118.4 | .34 | 5.16 | 8.6 | 139.4 | .25 | 3.21 | 26.3 | 4.04 | .37 |
| 1 | 1 | 9.2 | 5.9 | 235 | 3.15 | 15.2 | 97.0 | .33 | 3.78 | 11.7 | 115.4 | .29 | 4.06 | 8.3 | 133.5 | .21 | 2.12 | 24.1 | 5.97 | .27 |
| 1 | 2 | 10 | 5.9 | 246 | 3.23 | 16.8 | 99.6 | .37 | 3.79 | 12.8 | 112.0 | .32 | 4.09 | 9.0 | 126.7 | .22 | 2.15 | 26.4 | 5.72 | .31 |
| 1 | 4 | 10.9 | 5.87 | 189 | 3.14 | 16.4 | 96.6 | .35 | 3.82 | 11.9 | 116.1 | .30 | 4.22 | 9.2 | 128.6 | .24 | 2.23 | 26.2 | 5.32 | .31 |
| 1 | 9 | 11.6 | 5.65 | 244 | 3.08 | 15.6 | 96.7 | .33 | 3.75 | 11.9 | 112.8 | .29 | 4.06 | 8.0 | 140.5 | .20 | 2.24 | 27.2 | 4.75 | .32 |
| 0 | 1 | 12.3 | 5.8 | 221 | 3.02 | 15.2 | 93.7 | .32 | 3.56 | 10.9 | 110.3 | .25 | 3.71 | 8.4 | 122.4 | .19 | 2.22 | 26.6 | 5.29 | .32 |

*A=High D.P. low cellulose viscose; B=Low D.P. high cellulose viscose; $T_c$=Conditioned tenacity; $E_c$=Conditioned elongation; M=Initial modulus; B.E.=Breaking energy; $T_w$=Wet tenacity; $E_w$=Wet elongation; SM=Secant modulus, 0–5%.

Fibers were spun with the individual viscoses alone and a mixture of the two viscoses such that the resulting viscose composition had a cellulose content of 8.7 weight percent and a Ball Fall viscosity of 325 seconds. The acid in the spinning bath was regulated in each case to produce a maximum tenacity fiber. The fibers were spun from a 217 hole spinneret into aqueous spinning baths containing sulfuric acid, 14 weight percent sodium sulfate and 6 weight percent of zinc sulfate and maintained at 57° C. The resulting yarns were wet stretched to obtain filaments having a denier of 1.5.

The results of these spinnings are set forth in the following table.

TABLE III

| Viscose | Percent cellulose in viscose | 60% stretch | | 80% stretch | | 100% stretch | | 80% stretch | |
|---|---|---|---|---|---|---|---|---|---|
| | | $T_c$ | $E_c$ | $T_c$ | $E_c$ | $T_c$ | $E_c$ | $T_w$ | $E_w$ |
| 1st viscose | 6 | 4.32 | 15.3 | 5.21 | 10.9 | 5.46 | 6.7 | 3.79 | 27.6 |
| 1st and 2d mixed viscose | 8.7 | 3.92 | 16.7 | 4.69 | 12.3 | 5.27 | 8.8 | 3.24 | 27.8 |
| 2d viscose | 10 | 3.75 | 17.3 | 4.44 | 12.9 | 4.99 | 9.1 | 3.01 | 31.0 |

The above table demonstrates that viscoses prepared from two different pulps can be mixed and spun to produce fibers of good strength characteristics.

It has been concluded from the above results that high cellulose concentration low D.P. cellulose viscose and low cellulose concentration high D.P. cellulose viscose can be mixed and successfully spun into fibers. The mixed viscose will be a viscose composition of intermediate cellulose concentration in proportion to the mix ratio and the cellulose molecular weight distribution will be broader in the mixed viscose than in a viscose prepared to the same composition in a single operation, i.e., it will contain more large molecules and more small molecules but fewer intermediate size molecules.

Aside from the generally improved economy in the viscose process, this invention is useful, for example, under the following conditions:

(a) Improving viscose compositions where alkali cellulose crumb has been over-mercerized.

(b) Upgrading viscose compositions prepared from low D.P. waste regenerated cellulose.

(c) Preparing viscose with the elimination or shortening of alkali cellulose crumb aging time.

(d) Adjustment of Ball Fall viscosity of a viscose to any desired value.

(e) Adjustment of salt test (maturity) to any desired value.

(f) Reduction of alkali requirement for viscose with consequent reduction in spinning bath acid requirement.

(g) Rejuvenation of aged or overmature viscose. This may be accomplished more advantageously than in the prior art method of U.S. Pat. No. 2,232,326.

Various changes and modifications may be made in practicing the invention without departing from the spirit and scope thereof and, therefore, the invention is not to be limited except as defined in the appended claims.

I claim:

1. A viscose composition suitable for the preparation of shaped regenerated cellulose articles comprising a mixture of one part by weight of a first viscose containing up to about 7 weight percent cellulose having a D.P. of at least about 700 and from about 0.5 to about 5 parts by weight of a second viscose containing at least about 9 weight percent cellulose having a D.P. of no greater than about 550.

2. The viscose composition of claim 1 wherein said first viscose contains from about 4 to about 6% cellulose having a D.P. of from about 800 to about 1000.

3. The viscose composition of claim 1 wherein said second viscose contains from about 10 to about 15% cellulose.

4. The method of preparing regenerated cellulose articles comprising preparing a first vsicose containing up to about 7 weight percent cellulose having a D.P. of at least about 700, preparing a second viscose containing at least about 9 weight percent cellulose having a D.P. of no greater than about 550, mixing one part of said first viscose with from about 0.5 to about 5 parts of said second viscose, forming a shaped article from the mixed viscose, and coagulating and regenerating the shaped article.

5. The method of claim 4 wherein the second viscose is prepared from a cellulose pulp having an initial D.P. of no greater than 620.

6. The method of claim 4 wherein the second viscose is prepared by aging an alkali cellulose crumb having an initial D.P. in excess of 550 to an extent sufficient to provide an alkali cellulose having a D.P. of no greater than 550.

7. The method of claim 4 wherein the shaped article is a fiber.

8. The method of claim 4 wherein the coagulating and regenerating step includes immersing the shaped article in an aqueous acid bath.

9. The method of claim 8 wherein the shaped article is a fiber and it is stretched while still wet after coagulating and at least partially regenerating.

10. Regenerated cellulose fibers prepared by the method of claim 9.

References Cited
UNITED STATES PATENTS

| | | | |
|---|---|---|---|
| 1,949,919 | 3/1934 | Parker | 264—188 |
| 2,276,315 | 3/1942 | Kirk | 264—188 |
| 2,364,273 | 12/1944 | Cox | 264—188 |
| 2,403,437 | 7/1946 | Kohorn | 264—188 |
| 2,535,045 | 12/1950 | Cox | 264—188 |
| 2,586,796 | 2/1952 | Drisch et al. | 264—103 |
| 2,699,983 | 1/1955 | Drisch et al. | 264—188 |
| 2,805,119 | 9/1957 | Studer | 264—188 |
| 2,852,333 | 9/1958 | Cox et al. | 264—188 |
| 3,194,861 | 7/1965 | Bley | 264—189 |

JAY H. WOO, Primary Examiner

U.S. Cl. X.R.

106—165; 260—217; 264—188